United States Patent [19]

Kawada

[11] Patent Number: 4,878,189
[45] Date of Patent: Oct. 31, 1989

[54] MICROCOMPUTER HAVING Z-FLAG CAPABLE OF DETECTING COINCIDENCE AT HIGH SPEED

[75] Inventor: Kazuhide Kawada, Tokyo, Japan

[73] Assignee: NEC Corporation, Tokyo, Japan

[21] Appl. No.: 103,320

[22] Filed: Oct. 1, 1987

[30] Foreign Application Priority Data

Oct. 1, 1986 [JP] Japan ................................ 61-234924

[51] Int. Cl.$^4$ .............................................. G06F 7/00
[52] U.S. Cl. ................................................... 364/736.5
[58] Field of Search ...................... 364/736.5, 715, 716, 364/701, 200 MS File, 900 MS File; 340/146.2

[56] References Cited

U.S. PATENT DOCUMENTS 4,736,291 4/1988 Jennings et al. .................... 364/200

Primary Examiner—Gary V. Harkcom
Assistant Examiner—Long T. Nguyen
Attorney, Agent, or Firm—Foley & Lardner, Schwartz, Jeffery, Schwaab, Mack, Blumenthal & Evans

[57] ABSTRACT

A microcomputer comprises an arithmetic and logic unit having a pair of input connected to receive a pair of n-bit data and one output for generating a n-bit data of operation result. A NOR circuit is provided to receive the n-bit operation result from the arithmetic and logic unit for generating a signal of a high level when all the bits of the operation result are zero. An output of the NOR circuit is connected to one input of an AND circuit, whose output is connected to a first input of a multiplexor having a second input connected to receive a setting signal for start of coincidence detection operation. Further, there is provided a Z flag having an input connected to an output of the multiplexor and an output connected to the other input of the AND circuit. When the coincidence detection operation is started, the setting signal of a high level is applied through the multiplexor to the Z flag so as to set the Z flag. Therefore, at each time a comparison operation is executed by the arithmetic and logic unit, the output of the AND circuit is inputted through the multiplexor to the Z flag, so that the result of the coincidence detection operation can be judged from only the Z flag.

7 Claims, 2 Drawing Sheets

MICROCOMPUTER HAVING Z-FLAG CAPABLE OF DETECTING COINCIDENCE AT HIGH SPEED

BACKGROUND OF THE INVENTION

1. Field of the Invention

The present invention relates to a microcomputer and more specially to a microcomputer comprising a unit for storing that the result of an operation is "0".

2. Description of related art

Heretofore, some microcomputers include a unit for storing that the result of an operation is "0" (called "Z flag" hereinafter). For example, in the case that two operations A and B are continuously executed, the Z flag is set if the result of the operation A is 0, and the Z flag is reset if the result of the operation B is not 0. Accordingly, in order to know whether or not both the results of the serial operations A and B are "0", a complicated processing has been required. Specifically, the content of the Z flag is stored in a second memory unit after the execution of the operation A, and then, immediately after the execution of the following operation B a logical operation is executed between the content of the Z flag which stores the result of the operation B and the content of the second memory unit which store the result of the operation A.

Therefore, in the case of executing comparison or coincidence detection between two given data or numbers having a bit length longer than the bit length processed by a one-time operation of a microcomputer, each of the given numbers must be divided into two or more unitary portions having a bit length equal to or smaller than the bit length processed by one-time operation of the microcomputer, and comparison operations of the same number as the divisor of the data division must be sequentially carried out so that the results of the respective comparison operations are totalized. In addition, the above operation is executed in accordance with a programmed sequence. Accordingly, the longer the data to be compared becomes, the step number of a required program and the time necessary for execution of the operation are inevitably increased. In addition, a memory capacity for temporarily storing the results of the respective comparison operations is also increased.

SUMMARY OF THE INVENTION

Accordingly, it is an object of the present invention to provide a microcomputer which has overcome the above mentioned drawbacks of the conventional ones.

Another object of the present invention is to provide a microcomputer having a Z flag and capable of executing, with a small number of program steps, a comparison or coincidence detection between two given data having a bit length longer than that processed by a one-time operation of the microcomputer.

Still another object of the present invention is to provide a microcomputer having a Z flag and capable of executing comparison or coincidence detection between two given data having a bit length longer than that processed by a one-time operation of the microcomputer, without a temporary memory for storing the results of comparisons or coincidence detections.

A further object of the present invention is to provide a microcomputer having a Z flag and capable of executing, at a high speed, comparison or coincidence detection between two given data having a bit length longer than that processed by a one-time operation of the microcomputer.

The above and other objects of the present invention are achieved in accordance with the present invention by a microcomputer comprising operation unit receiving two input data for executing a designated operation for the two input data, a unit coupled to the operation unit for detecting that the result of operation is zero, unit coupled to the zero detection unit for storing the result of the zero detection, and a unit coupled to the zero detection unit for maintaining the zero detection storing unit to indicate that the result of operation is not zero although the zero is detected after a non-zero has been detected.

With this arrangement, once a non-zero is detected, the last named unit forcedly maintains the zero detection storing unit to continuously indicate that the result of operation is not zero although the zero is detected again. Therefore, if a non-zero is detected at one time, the zero detection storing unit never assumes a condition indicating that the result of operation is zero until required operations have been completed. Thus, by judging only the content of the zero detection storing means, there can be judged comparison or coincidence detection between two given data having a bit length longer than that processed by one time operation of the microcomputer.

The above and other objects, features and advantages of the present invention will be apparent from the following description of the preferred embodiment of the invention with reference to the accompanying drawings.

DESCRIPTION OF THE PREFERRED EMBODIMENT

Figure 1:
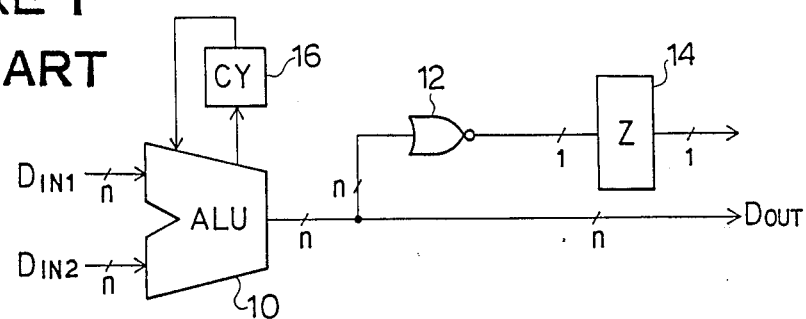
FIG. 1 is a block diagram of a portion of a microcomputer according to the prior art.

Referring to FIG. 1, there is shown a partial circuit diagram of a conventional microcomputer having a Z flag. An arithmetic and logic unit (called "ALU" hereinafter) 10 receives a pair of data $D_{IN1}$ and $D_{IN2}$, each of which is composed of n bits. The ALU 10 executes a designated operation for the pair of input data $D_{IN1}$ and $D_{IN2}$, and outputs the result of the operation in the form of a n-bit data $D_{out}$. The n bits of the output of the ALU 10 are inputted to a NOR circuit 12 in parallel, so that the NOR gate 12 outputs a high level when all the bits of the ALU output are 0 and a low level when at least one of the bits is not 0. An output of the NOR circuit 12 is connected to an input of a Z flag 14 constituted of a flip-flop. The Z flag 14 stores the output of the NOR circuit 12 when an operation instruction is executed, and outputs the content as the Z flag output. In addition, a carry flag (called "CY flag" hereinafter) 16 constituted of a flip-flop stores a high level if a carry is generated when the ALU 10 executes an addition or if a borrow is generated when the ALU 10 executes a subtraction and a low level in the other cases. Specifically, the CY flag stores a carry or borrow of the last executed operation. The operations with respect to the ALU 10 are separated into two sorts, that is, operations for only the values of the inputs $D_{IN1}$ and $D_{IN2}$, and operations using the content of the CY flag as a carry or borrow information from a low-order position. The latter is specially called an operation with carry flag.

Figure 2:
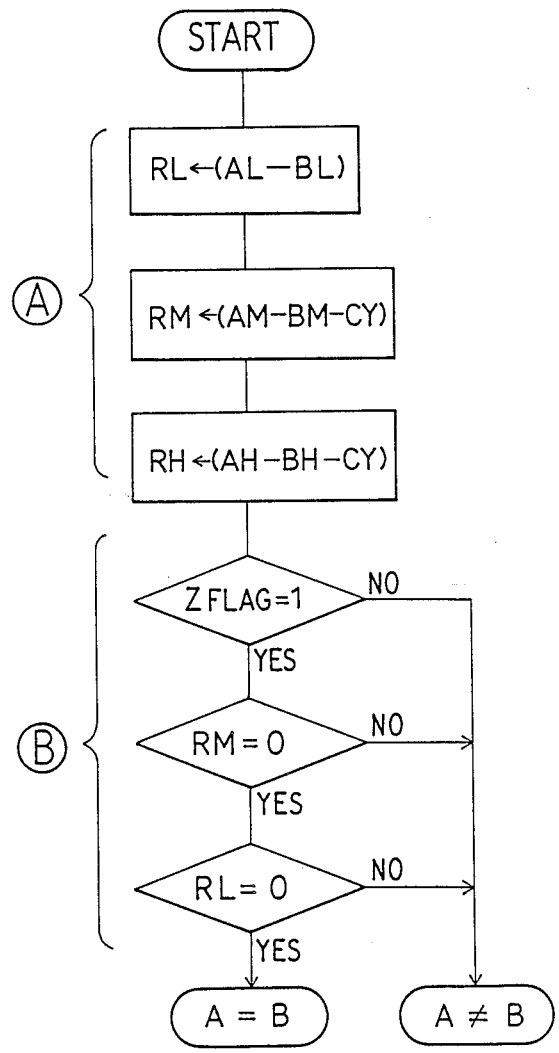
FIG. 2 is a flow chart of the data comparison by means of the microcomputer shown in FIG. 1.

Here, assume that the microcomputer including a circuit shown in FIG. 1 carries out a comparison between the data A and B of a 3n-bit width. The comparison can be executed easily by subtraction. However, the ALU 10 can execute only executions of a n-bit width so that it carries out an operation with carry flag. FIG. 2 is a flowchart illustrating a method of the comparison.

According to the method shown in FIG. 2, the data A and B are respectively divided into three parts of n-bits AL, AM, AH, BL, BM and BH, where AL and BL are indicative of lower n bits of the inputs A and B, respectively, AM and BM are representative of intermediate n bits of the inputs A and B, respectively, and AH and BH shows higher n bits of the inputs A and B, respectively. Thus, three subtractions of (AL−BL), (AL−BL) and (AH−BH) are executed, in order to judge whether the values of the data A and B correspond to each other or not. As a result, in the case that the Z flag is set (namely, RH is "0") and that RM and RL are both "0", it is judged that the data A and B correspond. Otherwise, it is judged that they don't correspond.

When a pair of data having a bit width larger than that processed by a one-time operation of the ALU 10 are compared in the above mentioned conventional microcomputer constituted of a circuit shown in FIG. 1, the same number of judgements as the divisor of the division of the data (the step number shown in the part B of FIG. 2) is required after a comparison (subtraction). Accordingly, the conventional microcomputer has the following disadvantages: The longer the bit length is, the larger the number of necessary program steps becomes, so that the cost of the programming and the cost of the memory which stores the program are increased, and further, the processing time becomes longer.

Figure 3:
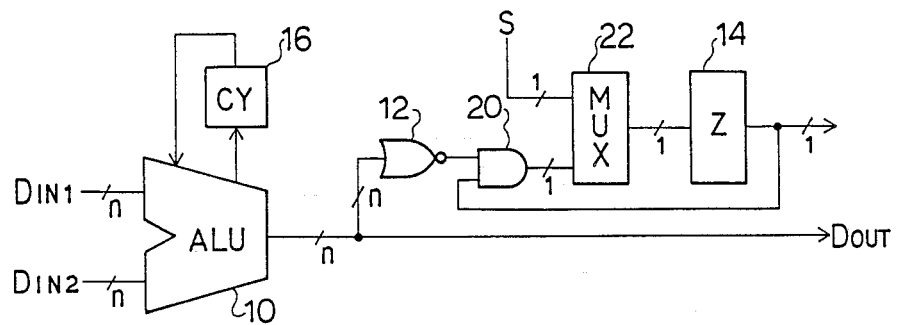
FIG. 3 is a block diagram which shows an embodiment of a microcomputer in accordance with the present invention.

Turning to FIG. 3, there is shown an embodiment of the microcomputer in accordance with the present invention. In FIG. 3, the same reference numbers as those in FIG. 1 denote the elements which have the same functions. Therefore, explanation on the same elements will be omitted.

The circuit shown in FIG. 3 includes an AND gate 20 receiving at its one input the output of the NOR gate 12 and at its other input the output of Z flag 21. Further, the shown circuit comprises a multiplexor (MUX) 22 having two inputs. The output of the AND gate 20 is inputted to one input of the MUX 22. A signal S for the execution of a Z flag operation instruction is inputted to the other input of the MUX 22. An output of the MUX 22 is connected to the input of the Z flag 14. The MUX 7 selects the output of the AND gate 20 in the course of the execution of an ordinary operation instruction and the signal S only in the course of the execution of the Z flag operation instruction. The Z flag 14 stores the data applied to its input only when the ordinary operation instruction or the Z flag operation instruction is executed.

The circuit shown in FIG. 3 operates as follows:

After the execution of the Z flag operation instruction, the Z flag 14 stores the content of the signal S and outputs it from the output thereof. Suppose that the Z flag is set to "1" according to the Z flag operation instruction.

In this condition, when the operation is carried out and all the output bits of the ALU 10 become "0", the output of the NOR gate 5 becomes a high level ("1"). Then, since the output of the Z flag 14 is "1" at this time, the output of the AND gate 20 becomes "1". The MUX 22 selects the output of the AND gate 20 by the execution of the ordinary operation instruction and outputs it to the Z flag 14. As a result, "1" is written in the Z flag 14. Specifically, the content of the Z flag 14, which is "1", does not change.

The subsequent operation is executed still in this condition. If the result of the operation is not "0", the output of the NOR gate 5 becomes a low level ("0") so that "0" is written into the Z flag 14 and "0" is outputted from the Z flag.

In the case that when the Z flag 14 holds "0" the operation is executed and then the result becomes "0", the output of the NOR gate 12 becomes "1". However, the AND gate 20 outputs "0" because the output of the Z flag 14 is "0". Therefore, the Z flag, which holds "0", does not change.

From the above description, it it found that the Z flag of the embodiment shown in FIG. 3 is not set again although an operation instruction is executed after the Z flag has been reset.

Figure 4:
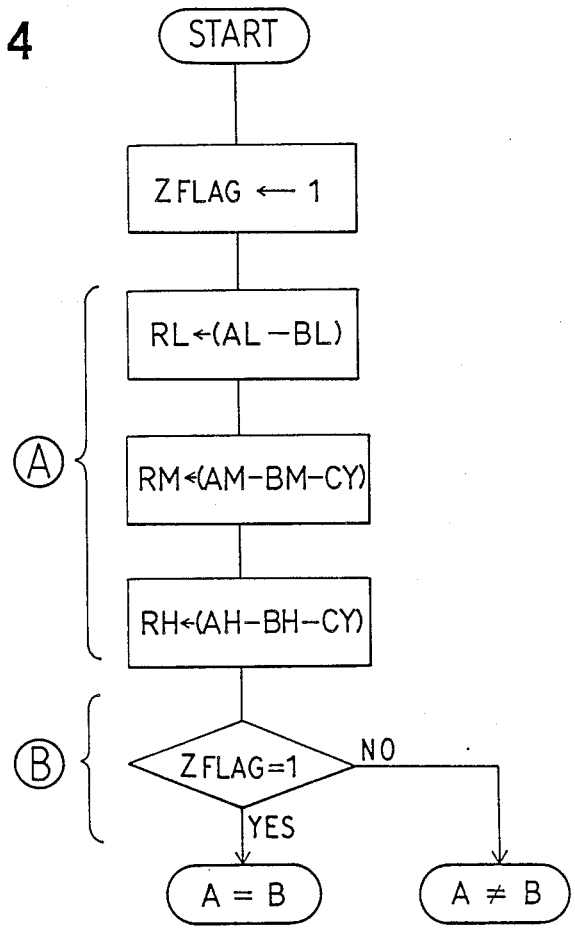
FIG. 4 is a flow chart of the data comparison by means of the microcomputer shown in FIG. 3.

FIG. 4 is a flow chart which illustrates the comparison of a data by means of a microcomputer comprising a circuit of the embodiment shown in FIG. 3. The comparative data are entirely the same as that of the flow chart illustrated in FIG. 2.

As shown in FIG. 4, in the shown microcomputer, the Z flag is set before the execution of the comparison. Then, the comparison (subtraction) is carried out (the part A of FIG. 4). In this case, it is possible to judge whether or not the pair or data corresponds to each other by a simple judgement of the content of the Z flag: That is, if the Z flag is set after the comparison, the pair of data coincide with, and if the Z flag is reset, the data do not correspond to each other.

Comparing the flow chart of the FIG. 4 with that shown in FIG. 2, the extra processing including setting the Z flag always before the comparison is required in the microcomputer shown in FIG. 3. However, the judgement of the correspondence can be accomplished only by judging the Z flag, independently of the bit length of the data. Specifically, the longer the bit length of the data to be compared becomes, the smaller the number of program steps of the microcomputer shown in FIG. 3 becomes in comparison with the conventional microcomputer. Accordingly, the processing time is greatly reduced.

As mentioned above, in the case of comparing the data of a long bit length, the microcomputer in accordance with the present invention can execute the processing by a smaller number of the program steps in comparison with the conventional microcomputer. Accordingly, the microcomputer in accordance with the present invention has such important effects as to be capable of lowering the cost of the memory for storing the program and of reducing the program processing time.

The invention has thus been shown and described with reference to the specific embodiments. However, it should be noted that the invention is in no way limited to the details of the illustrated structures but changes and modifications may be made within the scope of the appended claims.

I claim:

1. A microcomputer comprising:
   operation means receiving two input data for executing designated operations in sequence for the two input data,
   zero detection means coupled to the operation means for detecting that the result of each of the designated operations is zero,
   storing means coupled to the zero detection means for storing the result of zero detection, and
   control means coupled to the zero detection means and the storing means for controlling the storing means to indicate that the result of operation is not zero although the zero is detected by the zero detection means after a non-zero has been detected once by the zero detection means and stored in the storing means in the sequence of the designated operations.

2. A microcomputer as claimed in claim 1 wherein the operation means includes an arithmetic and logic circuit having a pair of inputs connected to receive the two input data, and an output of a plurality of bits coupled to the zero detection means.

3. A microcomputer as claimed in claim 2 wherein the zero detection means includes a NOR circuit receiving in parallel all the bits of output data of the operation means for generating a signal of a high level when all the bits of output data of the operation means are zero.

4. A microcomputer as claimed in claim 3 wherein the storing means includes a Z flag constituted of a flip-flop receiving an output of the control means.

5. A microcomputer as claimed in claim 4 wherein the control means includes an AND circuit receiving at its one input an output of the NOR circuit and at its other input an output of the Z flag, an output of the AND circuit being coupled to an input of the Z flag.

6. A microcomputer as claimed in claim 5 further including a multiplexor having a first input connected to the output of the AND circuit and a second input connected to receive a setting signal, an output of the multiplexor being connected to the input of the Z flag.

7. A microcomputer comprising:
   an arithmetic and logic unit having a pair of input connected to receive a pair of n-bit data and one output for generating a n-bit data of operation result, the arithmetic and logic unit being capable of comparing a pair of input data each exceeding n-bits by sequentially performing a comparison operation for each n-bit portion of the input data pair,
   a NOR circuit receiving the n-bit operation result from the arithmetic and logic unit for generating a signal of a high level when all the bits of the operation result are zero in each of the sequential comparison operations,
   an AND circuit having a first input connected to an output of the NOR circuit and a second input,
   a multiplexor having a first input connected to an output of the AND circuit and a second input connected to receive a setting signal for start of coincidence detection operation, and
   a Z flag having an input connected to an output of the multiplexor and an output connected to the second input of the AND circuit, whereby when the coincidence detection operation is started, the setting signal of a high level is applied through the multiplexor to the Z flag so as to set the Z flag, and at each time the comparison operation is executed by the arithmetic and logic unit, the output of the AND circuit is inputted through the multiplexor to the Z flag, so that when the result of the comparison operation is a non-zero, the Z-flag is reset by the NOR circuit, and thereafter, the reset condition of the Z-flag is maintained, although the zero is again detected by the NOR circuit in the sequence of comparison operations, with the result that the result of the coincidence detection operation can be judged from only the Z flag.

* * * * *